US007542833B2

(12) United States Patent  (10) Patent No.: US 7,542,833 B2
Kelly et al.  (45) Date of Patent: Jun. 2, 2009

(54) METHOD AND SYSTEM OF MANAGING SERVICE REMINDERS AND SCHEDULING SERVICE APPOINTMENTS USING MILEAGE ESTIMATES

(75) Inventors: John Kelly, Hudson, OH (US); John Supra, Redono Beach, CA (US); Michael Rush, Camas, WA (US)

(73) Assignee: The Cobalt Group, Inc., Seattle, WA (US)

( * ) Notice: Subject to any disclaimer, the term of this patent is extended or adjusted under 35 U.S.C. 154(b) by 853 days.

(21) Appl. No.: 10/859,400

(22) Filed: Jun. 2, 2004

(65) Prior Publication Data

US 2004/0249530 A1 Dec. 9, 2004

Related U.S. Application Data

(60) Provisional application No. 60/476,203, filed on Jun. 3, 2003.

(51) Int. Cl.
*G01M 17/00* (2006.01)
(52) U.S. Cl. ...................... 701/30; 370/457.4
(58) Field of Classification Search .............. 701/30
See application file for complete search history.

(56) References Cited

U.S. PATENT DOCUMENTS

| 4,612,623 | A | * | 9/1986 | Bazarnik | 702/177 |
|---|---|---|---|---|---|
| 4,739,482 | A | | 4/1988 | Wrigge | |
| 4,884,054 | A | | 11/1989 | Moon, Sr. | |
| 5,642,284 | A | * | 6/1997 | Parupalli et al. | 701/30 |
| 5,931,878 | A | * | 8/1999 | Chapin, Jr. | 701/30 |
| 6,003,635 | A | | 12/1999 | Bantz et al. | |
| 6,052,631 | A | * | 4/2000 | Busch et al. | 701/29 |
| 6,263,322 | B1 | | 7/2001 | Kirkevold et al. | |
| 6,324,659 | B1 | | 11/2001 | Pierro | |
| 6,338,152 | B1 | | 1/2002 | Fera et al. | |
| 6,526,335 | B1 | | 2/2003 | Treyz et al. | |
| 6,654,770 | B2 | * | 11/2003 | Kaufman | 707/200 |
| 6,677,854 | B2 | * | 1/2004 | Dix | 340/438 |
| 6,768,994 | B1 | | 7/2004 | Howard et al. | |

(Continued)

OTHER PUBLICATIONS

Office Action for U.S. Appl. No. 10/453,094, filed Jun. 2, 2003, mailed from the USPTO on Oct. 31, 2005, 11 pgs.

(Continued)

*Primary Examiner*—Thomas G Black
*Assistant Examiner*—Shelley Chen
(74) *Attorney, Agent, or Firm*—John R. Thompson; Stoel Rives LLP

(57) ABSTRACT

The present invention provides a method and system for scheduling service appointments based on service reminders sent based on the estimated mileage the vehicle. The mileage of the vehicle can be estimated based on the age of the vehicle, or it can be based on the last known mileage of the vehicle and estimating the additional mileage using average vehicle mileage statistics. The mileage of the vehicle may be estimated based on actual vehicle history, and may be adjusted based on the characteristics of the vehicle, the driver, or the geographic location of the vehicle. Service reminders sent to a recipient include a link to a scheduling server. The scheduling server provides a scheduling page allowing the recipient to view and select from available service time slots at the service shop.

7 Claims, 13 Drawing Sheets

U.S. PATENT DOCUMENTS

| | | | |
|---|---|---|---|
| 6,907,849 | B2 | 6/2005 | Galvin |
| 6,963,851 | B1 | 11/2005 | Szabo et al. |
| 7,051,044 | B1 | 5/2006 | Fera et al. |
| 2002/0073012 | A1 | 6/2002 | Lowell et al. |
| 2002/0107873 | A1 | 8/2002 | Winkler et al. |
| 2002/0194051 | A1 | 12/2002 | Hall et al. |
| 2003/0120757 | A1 | 6/2003 | Baldwin et al. |
| 2003/0130989 | A1 | 7/2003 | Kaufman |
| 2004/0039493 | A1 | 2/2004 | Kaufman |
| 2004/0039494 | A1 | 2/2004 | Kaufman |
| 2004/0243289 | A1* | 12/2004 | Kelly et al. .............. 701/30 |
| 2004/0243619 | A1* | 12/2004 | Kelly et al. .............. 707/102 |
| 2004/0249529 | A1* | 12/2004 | Kelly et al. .............. 701/30 |
| 2004/0249530 | A1* | 12/2004 | Kelly et al. .............. 701/30 |
| 2004/0249531 | A1* | 12/2004 | Kelly et al. .............. 701/30 |
| 2004/0249532 | A1* | 12/2004 | Kelly et al. .............. 701/30 |
| 2005/0015186 | A1* | 1/2005 | Kelly et al. .............. 701/29 |
| 2005/0165639 | A1 | 7/2005 | Ross et al. |

OTHER PUBLICATIONS

Office Action for U.S. Appl. No. 10/860,540, filed Jun. 2, 2004, mailed from the USPTO on Jun. 19, 2007, 9 pgs.

Office Action for U.S. Appl. No. 10/860,530, filed Jun. 2, 2004, mailed from the USPTO on Apr. 5, 2007, 8 pgs.

Office Action for U.S. Appl. No. 10/858,877, filed Jun. 1, 2004, mailed from the USPTO on May 17, 2005, 16 pgs.

Office Action for U.S. Appl. No. 10/453,459, filed Jun. 2, 2003, mailed from the USPTO on Apr. 10, 2007, 8 pgs.

Office Action for U.S. Appl. No. 10/858,879, filed Jun. 1, 2004, mailed from the USPTO on May 2, 2006, 9 pgs.

Office Action for U.S. Appl. No. 10/860,539, filed Jun. 2, 2004, mailed from the USPTO on Sep. 3, 2008, 10 pgs.

Office Action for U.S. Appl. No. 10/435,904, filed Jun. 2, 2003, mailed from the USPTO on Jan. 23, 2009, 10 pgs.

Office Action for U.S. Appl. No. 10/860,540, filed Jun. 2, 2004, mailed from the USPTO on Jan. 28, 2009, 12 pgs.

Office Action for U.S. Appl. No. 10/453,459, filed Jun. 2, 2003, mailed from the USPTO on Nov. 14, 2008, 11 pgs.

Steinfield, Charles, et al., "Integrating Brick and Mortar Locations with E-Commerce: Understanding Synergy Opportunities," Proceedings of the 35th Annual Hawaii International Conference on System Sciences, (HICSS-35'02), 2002 IEEE, pp. 2920-2929.

Wang, Hu, et al., "Service-mining Based on the Knowledge and Customer Databases," 6th IEEE/ACIS International Conference on Computer and Information Sciences (ICIS 2007), 2007 IEEE, pp. 561-568.

Yueh, Yves T.F., et al., "A Virtual Travel Agent System for M-Tourism with Semantic Web Service Based Design and Implementation," 21st International Conference on Advanced Networking and Applications (AINA 2007), 2007 IEEE, pp. 142-149.

Office Action for U.S. Appl. No. 10/453,904, filed Jun. 2, 2003, mailed from the USPTO on Jan. 23, 2009, 10 pgs.

\* cited by examiner

Dear Steve, ⟵ 701

As your 1999 Jeep Grand Cherokee is approaching 60,000 ⟵ 702
miles, it is time to schedule a visit to cover the manufacturer's
recommended replacement of belts and hoses when the Grand
Cherokee reaches 60,000 miles. ⟵ 705

704, 703 above.

We are also running a special this month on our Premium Wash ⟵ 706
and Hot Wax, for only $9.95 with any scheduled service.

Please click on the link below to connect to our web site to
schedule your service. If there are any problems or questions, ⟵ 707
my contact information is available below.

Https://www.lakefrontchryslerjeep.com/servicedept/ ⟵ 708
schedule.htm

Thank You
⟵ 709

Jim Ambers
Service Manager
Lake Front Chryssler-Jeep
402-555-7100

Figure 7

METHOD AND SYSTEM OF MANAGING SERVICE REMINDERS AND SCHEDULING SERVICE APPOINTMENTS USING MILEAGE ESTIMATES

RELATED APPLICATION DATA

This patent application claims priority to U.S. Provisional Patent Application No. 60/476,203, filed Jun. 3, 2003, which is hereby incorporated by reference.

BACKGROUND

1. Field of the Invention

The field of the invention relates generally to systems for maintaining and managing customer relationships. More particularly, the present invention relates to the field of providing timely reminders for customers scheduling service appointments.

2. Related Background

The ability to generate repeat customer visits is a key aspect in the ability of a service shop to remain in business and increase profitability. Existing systems and methods of generating promotions typically rely on a vehicle's age, or elapsed time from a prior service visit, to send a service reminder or promotion. Often, service reminders are sent at regular time intervals, for example sending an oil change reminder every three months. The hope with such systems is that a reminder for a service reminder, for example a 30,000 mile brake inspection, will be received when the vehicle has around 30,000 mile on the odometer. Given the wide variance in the number of miles a particular vehicle may be driven in a given time, such reminders often arrive well outside of the desired range—thereby decreasing the chances the vehicle owner will respond to the service reminder by scheduling a service visit.

Accordingly, a need exists to provide timely and relevant reminders for automobile service.

BRIEF DESCRIPTION OF THE FIGURES

FIG. 7 illustrates an example e-mail service bulletin reminder, in accordance with the present invention.

SUMMARY

The present invention provides for a computer based system and method for generating reminders for mileage dependent servicing of vehicles. According to one aspect of the invention, a service reminder is generated by estimating a vehicles mileage and determining whether the estimated mileage falls within a relevant service window, and sending the service reminder if the mileage falls within the relevant service window. According to another aspect of the invention, the estimation of the vehicles mileage is calculated using average vehicle mileage statistics and the last know mileage of the vehicle. According to another aspect of the present invention, estimation of the vehicle's mileage is calculated using average vehicle mileage statistics and the age of the vehicle.

DETAILED DESCRIPTION

The present invention is described in the context of a specific embodiment. This is done to facilitate the understanding of the features and principles of the present invention and the present invention is not limited to this embodiment. In particular, the present invention is described in the context of a mileage-based service bulletin reminder for an automobile.

Figure 1:
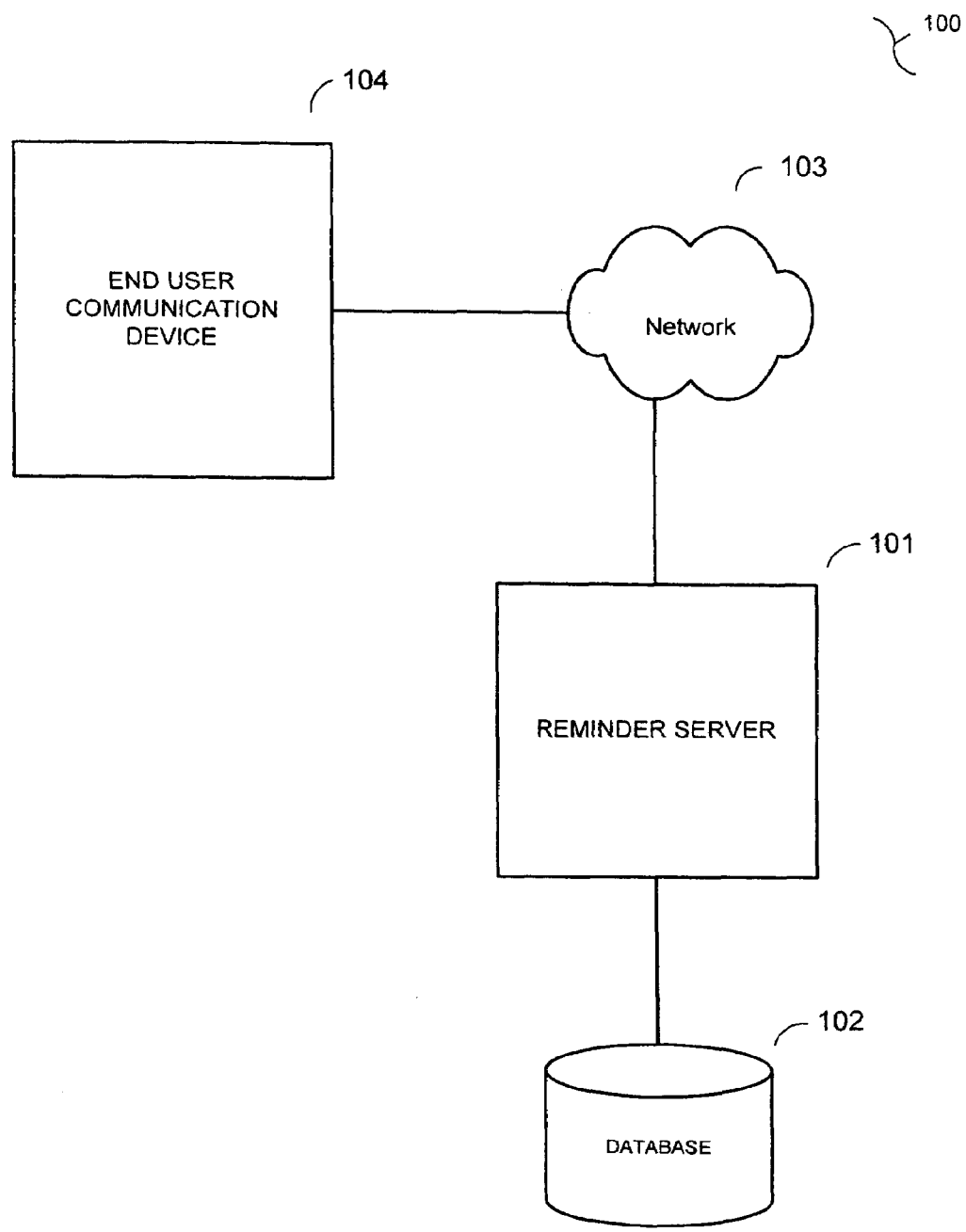
FIG. 1 is a generalized block diagram of a computer system that may be used to implement the present invention.

FIG. 1 is a block diagram of a computer system 100 that may be used to implement embodiments of the present invention. Computer system 100 includes a reminder server 101, connected to a database server 102 and a communications network 103. The communications network is connected to an end user communications device 104. In the presently preferred embodiment, the end-user communications device is a personal computer, connected to the internet, and capable of receiving either e-mail, web based e-mail, or instant messenger (IM) messages. Connection to the Internet could be by any form of Internet connection, including broadband and wireless connection. Alternatively, the end user communications device could be a mobile phone (including mobile phones with text messaging capabilities), standard telephone, or any other device capable of receiving text or voice messages.

While the presently preferred embodiment utilizes a database server 102 as a separate server from the reminder server 101, alternate embodiments could have the database run on the same computer as the reminder server. Additionally, the information stored within the singe database of the presently preferred embodiment could be distributed among several databases in alternative embodiments.

Figure 2:
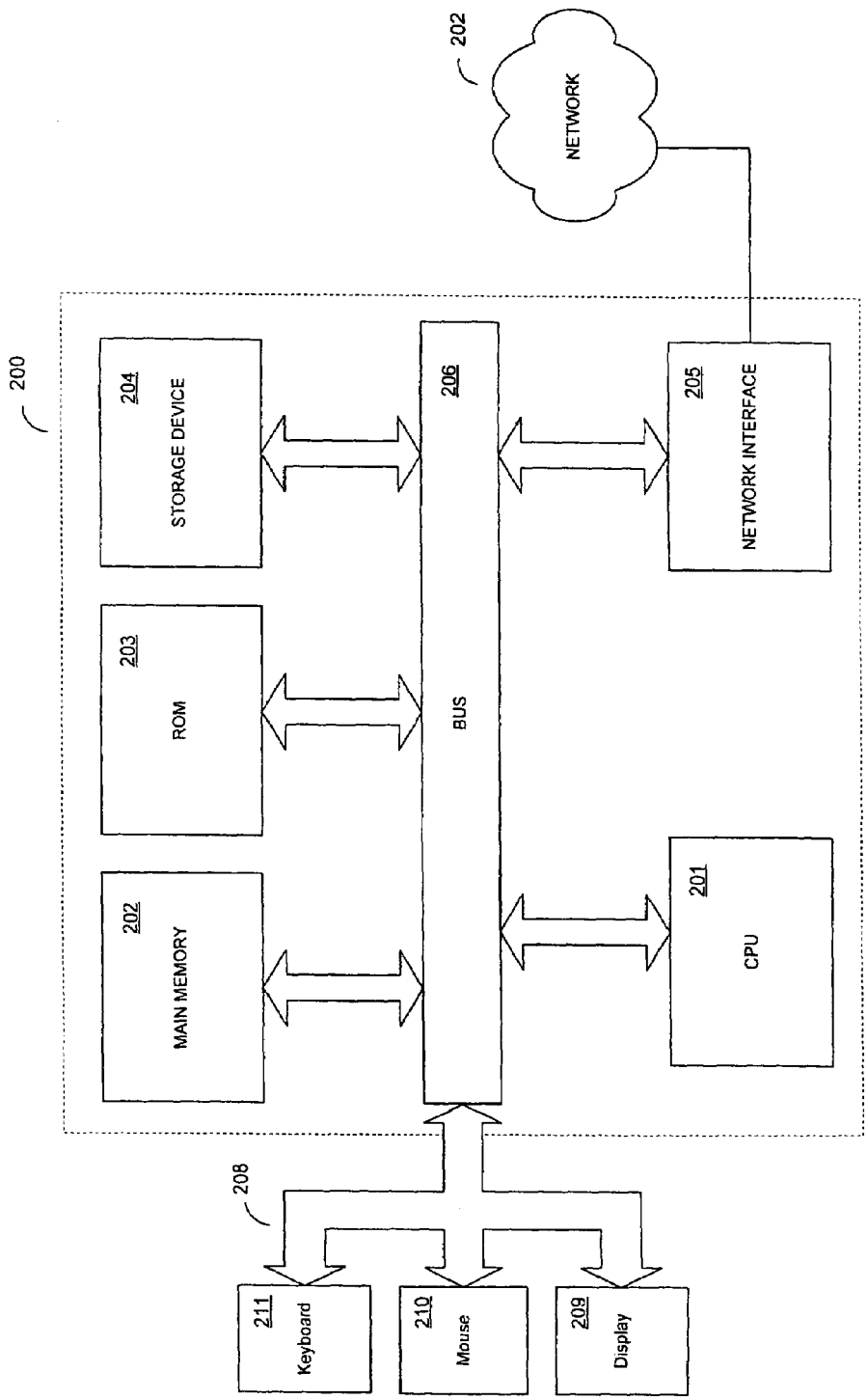
FIG. 2 is a generalized block diagram of a server computer that may be used to implement the present invention

The reminder server is similar in general architecture to the database server and end user communication device. FIG. 2 is a generalized block diagram of a server computer 200 including a central processing unit (CPU) 201, main memory (typically RAM) 202, read-only memory (ROM) 203, a storage device (typically a hard drive) 204, and a network device (typically a network interface card, a.k.a. NIC) 205. The server includes a bus 206 or other communication mechanism for communicating information between the CPU 201 coupled with bus 206. The CPU 201 is used for processing instructions and data. The main memory 202, ROM 203 and storage device 204 are coupled to bus 206 and store information and instructions to be executed by processor 201. Main memory 202 also may be used for storing temporary variables or other intermediate information during execution of instructions to be executed by processor 201.

Server 200 may be coupled via bus 208 to a display 209, such as a cathode ray tube (CRT) or flat panel monitor, for displaying information to a computer user. An input device 210, such as a keyboard, is coupled to bus 208 for entering information and instructions to the server 200. Additionally, a user input device 211 such as a mouse, a trackball, or cursor direction keys for communicating direction information and command selections to the processor 201 and for controlling cursor movement on the display 209 may be used with the server 200.

The server 200 is designed to run programs implementing methods, such as the methods of the present invention. Typically such programs are stored on the hard drive of the server, and instructions and data of the program are loaded into the RAM during operation of the program. Alternate embodiments of the present invention could have the program loaded into ROM memory, loaded exclusively into RAM memory, or could be hard wired as part of the design of the server. Accordingly, programs implementing the methods of the present invention could be stored on any computer readable medium coupled to the server. The present invention is not limited to any specific combination of hardware circuitry and software, and embodiments of the present invention may be implemented on many different combinations of hardware and software.

As used within the present application, the term "computer-readable medium" refers to any medium that participates in providing instructions to CPU 201 for execution. Such a medium may take many forms including, but not limited to, non-volatile media, volatile media, and transmission media. Examples of non-volatile media include, for example, optical or magnetic disks, such as storage device 204. Examples of volatile media include dynamic memory, such as main memory 202. Additional examples of computer-readable media include, for example, floppy disks, hard drive disks, magnetic tape, or any other magnetic medium, a CD-ROM, any other optical medium, punchcards or any other physical medium with patterns of holes, a RAM, a PROM, and EPROM, a FLASH-EPROM, any other memory chip, stick or cartridge, a carrier wave as described hereinafter, or any other medium from which a computer can read. Transmission media includes coaxial cables, copper wire and fiber optics, including the wires that comprise bus 206 and 208. Transmission media can also take the form of acoustic, electromagnetic or light waves, such as those generated during radio-wave and infra-red data communications.

Updating Mileage and Generating Service Reminders

Figure 3:
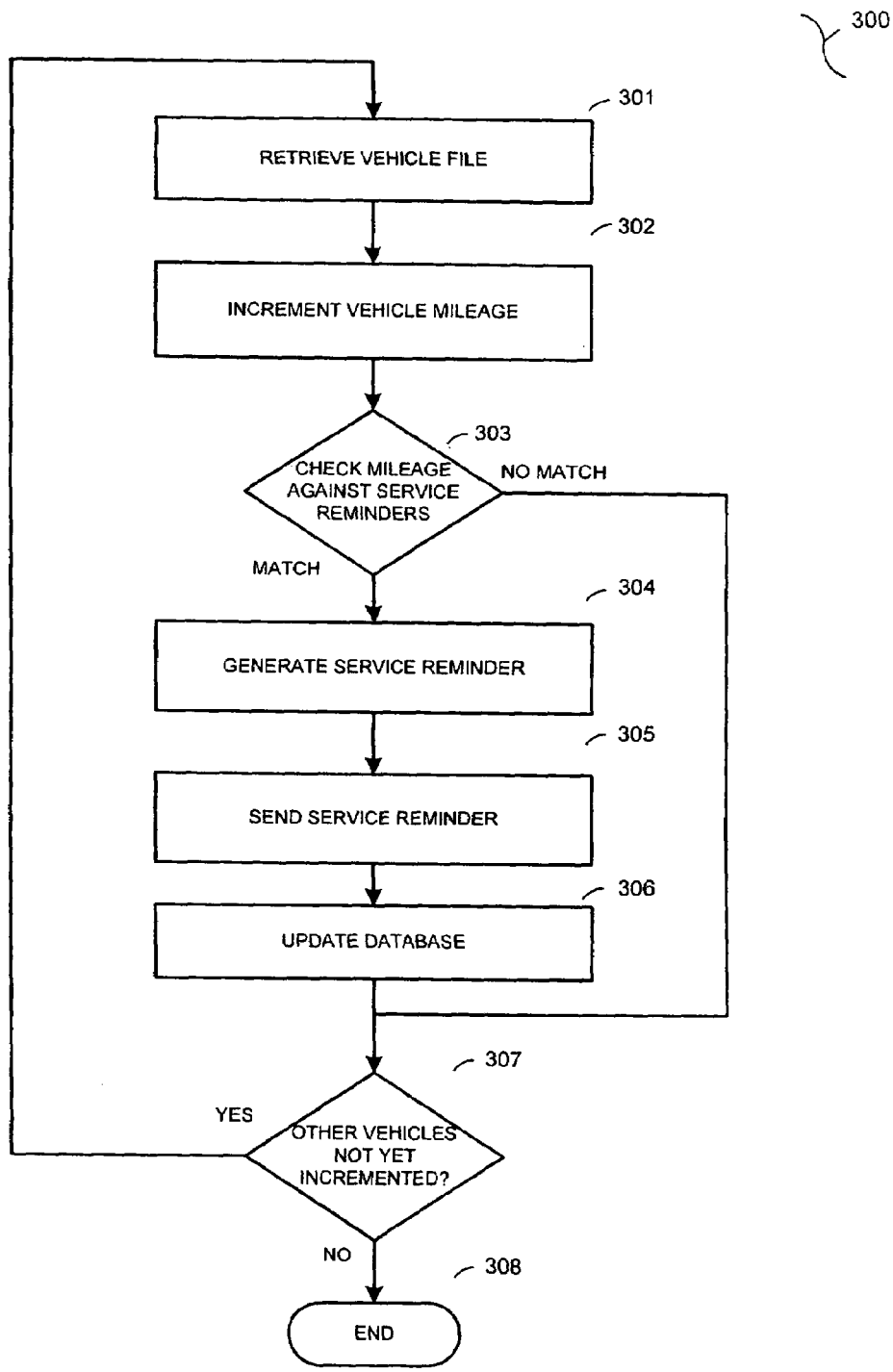
FIG. 3 is a flow diagram illustrating the process of updating vehicle mileage and generating service reminders, in accordance with the present invention.

FIG. 3 is a flow diagram illustrating the process 300 of updating vehicle mileage and generating service reminders. As used herein, the term vehicle refers to any vehicle which may require servicing based upon the distance traveled, including, without limitation, automobiles, light trucks, SUVs, motorcycles, heavy trucks, construction or farm equipment, trains, boats, bicycles, etc. The term mileage, as used herein, is used generally to refer to the measured distance the vehicle has traveled, which could be measured in units of miles, kilometers, hours operated, or any other unit of distance corresponding to wear and tear on the vehicle. At step 301 the system retrieves vehicle information from the database 102. In the presently preferred embodiment vehicle information retrieved includes the make and model of the vehicle, the age of the vehicle, the most recent known mileage of the vehicle (if available), service history (if any), a unique identifier for the vehicle, and information regarding the owner of the vehicle such as the owner's name and contact information. Additionally, data regarding past service reminders, including the most recent service reminders, could also be retrieved at step 301. At step 302 the system updates the mileage of the vehicle to create an estimate of the current mileage of the vehicle. After updating the current mileage estimate of the vehicle at step 302, the system proceeds to step 303 to determine whether there is a mileage-based service reminder corresponding to the vehicle using the updated mileage estimate.

Service reminders can be based on several criteria, such as the mileage of the vehicle, the age of the vehicle, the season, or other factors which may impact the need for servicing the vehicle. One possible example of a mileage based service bulletin would be for a 30,000 mile brake check. A service reminder window for this brake check service reminder is 27,000 miles to 33,000 miles. Thus, the system would send a service reminder to the owner of a vehicle having a current mileage estimate between 27,000 miles and 30,000 miles.

While most mileage specific service reminders will be based on a total mileage of the vehicle, the present invention allows for mileage specific service reminders that are either mileage additive or mileage specific to a component of the vehicle. A mileage additive service reminder allows for a reminder to be sent when the vehicle has put an additional present mileage on the vehicle. For example, a service technician could, after noticing the break wear on the vehicle, enter a reminder into the system to be sent a brake service reminder when the vehicle is estimated to have an additional 5,000 miles on the odometer. The component mileage reminder allows the accumulated mileage of a specific component of the vehicle to trigger the sending of a service reminder. For example, a truck where the transmission was replaced at 120,000 miles may be set for a 50,000 miles service to the replaced transmission. As the vehicle itself has over 50,000 miles on its odometer, the present invention allows for the estimation of mileage on specific components based upon service history (the date and nature of the service, as well as the recorded or estimated mileage at the service interval). If the replacement part is not new, the system can account for mileage the replacement part had on it prior to installation in estimating the mileage on the replacement part, or the system can schedule replacement parts for more frequent service—as may be necessary when there is no reliable estimate for the mileage on a used or refurbished replacement part.

At step 303 the system compares the current mileage estimate from step 302 against a list of mileage-based service reminders with mileage based reminder windows. Information regarding the service reminders is stored in the database 102 and can be retrieved either at step 301 or at step 303. The information regarding a service bulletin reminder retrieved from the database includes an identifier (or name) identifying the service bulletin reminder, vehicle make and model information (if the service reminder is make or model specific), vehicle mileage window information, and seasonal or date information (if the service reminder is specific to a particular season or seasons, or has a particular date information associated with it). Additionally, other details of the vehicle can be compared to the criteria of the service reminder to determine whether the service reminder is appropriate for that vehicle. Examples of other details include the vehicle's transmission type (automatic or manual), engine type, option packages, modifications or prior service history, whether the vehicle typically experiences normal, severe or unusual driving conditions (for example, towing a heavy trailer or a high degree of stop and go traffic, or with a shuttle bus, may rate a "severe" driving condition criteria whereby the vehicle will qualify for different maintenance or at different maintenance intervals) or any other aspects that can influence the type of service appropriate for the vehicle. The system compares the vehicle information to the service bulletin reminders to check if there is a matching service reminder for that vehicle and where the vehicles current mileage estimate is within the service window for the service bulletin reminder. Additionally, at step 303 the system checks that seasonal or date information for the service bulletin also matches the current season or date. The system can also screen the reminder against previously sent reminders to prevent duplication or excessive notices, for example by checking whether a particular reminder has already been sent for the particular service bulletin. If at step 303 one or more of the service bulletins matches the information for the vehicle then the system proceeds to step 304. If none of the service bulletins match the vehicle's attributes, then the system proceeds to step 307.

At step 304 the system generates a service bulletin reminder based on the vehicle's information, including the name and contact information of the vehicle's owner, as well as information pertaining to the service bulletin, including the name of the service identifier and mileage information. The type of reminder generated, for example an e-mail, regular postal mail, or a voice mail, can be based upon the contact information of the vehicle's owner (or primary contact regarding servicing the vehicle) or preference information regarding the preferred method of sending the reminder. An example e-mail service bulletin reminder is described below in connection with FIG. 7. After generating the service bulletin reminder at step 304 the system proceeds to step 305.

At step 305 the system sends the service bulletin reminder (according to the preferred method of transmitting the reminder) to an identified recipient (typically the vehicle's owner, or another person responsible for maintenance and servicing of the vehicle). The timing of sending the service bulletin reminder can be controlled depending on multiple factors. The system can send multiple reminders at a specific time or time frame, for example to suit other factors such as network bandwidth constraints, etc. Alternatively, the reminder can be sent at a time must appropriate to be received, as with a voice mail reminder. After the reminder has been sent at step 305 the system proceeds to step 306.

At step 306 the system updates the database to include information regarding the reminder just sent. The vehicle information data is updated to include the identifier of the sent service bulletin reminder, the date and time the service bulletin was sent, the mileage of the vehicle on the date the reminder was sent, the address the reminder was sent to (e-mail address, physical address, IM user ID, phone number, etc.) and the method of sending the reminder (e-mail, postal mail, voice message, IM message, etc.).

After updating the database at step 306 the system proceeds to step 307 where it determines whether there are other vehicles in the database scheduled for updating and service bulletin reminder screening. In the presently preferred embodiment, the system updates the mileage of all the vehicles in the database and checks for matching service bulletins on a daily basis. More particularly, the present invention performs updates and checks each night, and sends out service bulletin e-mail reminders at night. Alternate embodiments of the present invention could perform updating and checking at other intervals, and could schedule reminder notices at times most appropriate to the method of sending the reminder. Additionally, the system could process a portion of all the vehicles in the database by scheduling only a subset of all vehicles in the database for updating and reminder screening. If at step 307 the system determines that all vehicles to be updated and screened for reminders have been updated and screened, then the system proceeds to step 308 and ends the updating and screening process. However, if at step 307 the system determines that it has not yet completed all vehicles scheduled to be updated and screened, the system then proceeds to step 301 where it retrieves vehicle information for a vehicle which has yet to be updated and screened. Accordingly, the system proceeds until it has completed all vehicles that are to be updated and screened for service bulletin reminders.

Estimating Vehicle Mileage

Figure 4:
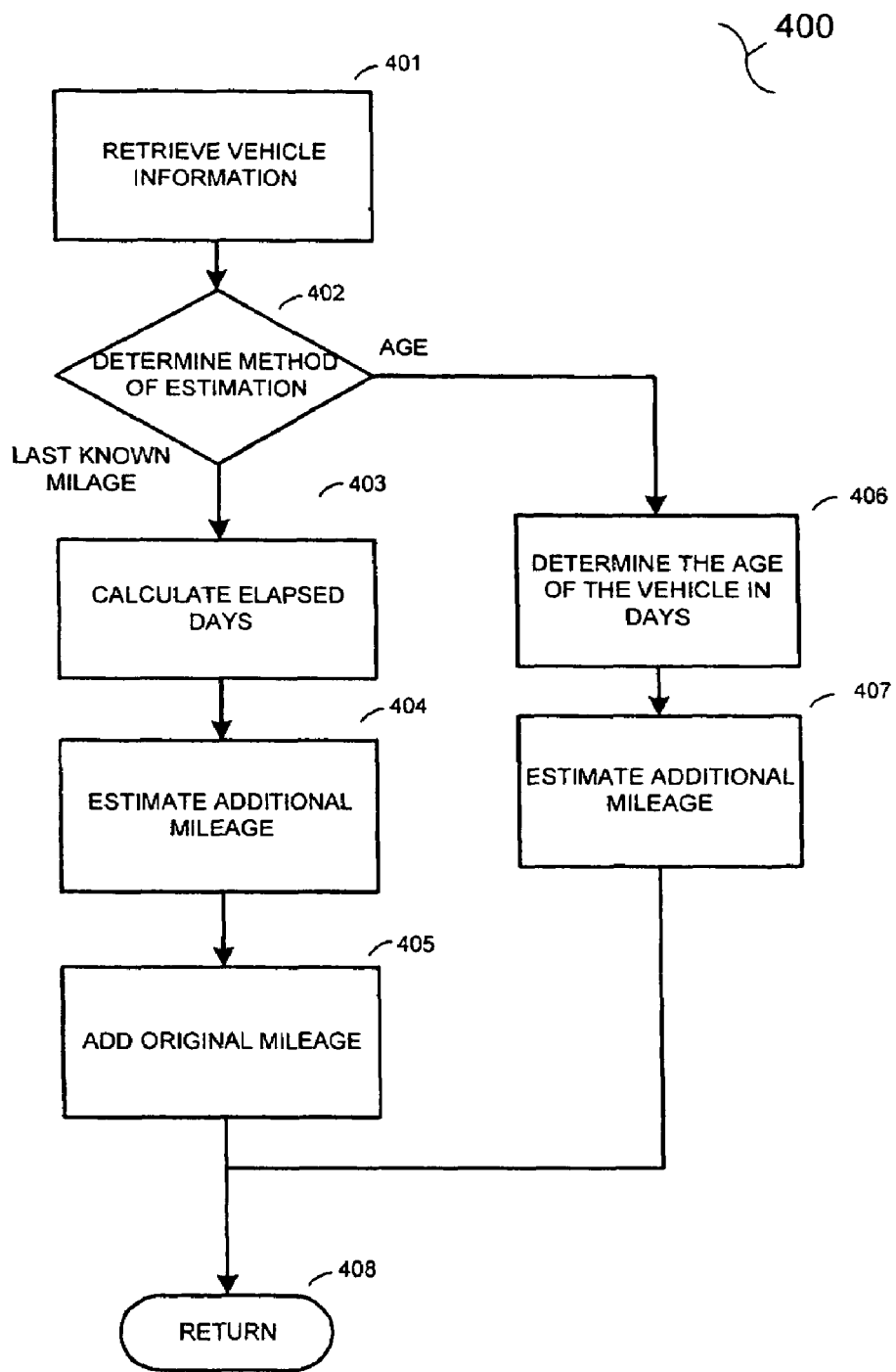
FIG. 4 is a flow diagram illustrating the process of updating vehicle mileage, in accordance with the present invention.

FIG. 4 illustrates one process 400 of updating the vehicle's mileage. At step 401 the system retrieves information from the database on the vehicle's mileage. This information includes the last known mileage of the vehicle (if available), the date the last known mileage was recorded, the age of the vehicle, and the preferred method of estimating the vehicles mileage. After step 401 the system proceeds to step 402 to determine which method of estimating the vehicle's current mileage is to be used. At step 402 the system checks to see if there the information retrieved at step 401 includes data specifying which method is to be used. If the information indicates the vehicle's age should be used, then the system proceeds to step 407. If the information indicates the vehicle's last known mileage should be used and updated, then the system proceeds to step 403.

In the presently preferred embodiment the database includes information which specifies which process of updating the vehicle's mileage should be used. Alternative embodiments of the present invention could use the existence of the vehicle's last known mileage to determine how a current mileage estimate is calculated. For example, if at step 402 there is no value, or a zero value, for the vehicle's last known mileage, the system proceeds to step 407. If at step 402 there is a last known mileage, or a non-zero mileage for the vehicle, the system proceeds to step 403. Ideally, the last known Mileage would be a mileage taken from a reading of the vehicle's odometer. However, estimates or other information may be used if an actual reading of the odometer is not available.

At step 403 the system determines the number of days elapsed since the last known mileage of the vehicle was determined. While in the presently preferred embodiment the last known mileage would represent an actual reading of the vehicle's odometer, alternative embodiments could use an estimated value as the vehicle's last known mileage. At step 404 the system determines an estimate of additional mileage put on the vehicle according to Equation 1 where:

$$\text{Additional Mileage} = (\text{days elapsed}) \times (\text{avg. daily mileage}) \quad \text{Eqn. 1}$$

The system then proceeds to step 405, where the vehicle's current mileage is estimated using Equation 2, where:

$$\text{Current Mileage} = \text{Additional Mileage} + \text{Last Known Mileage} \quad \text{Eqn. 2}$$

The system then proceeds to step 408 and returns the estimate of the Current Mileage.

If after step 402 the system proceeds to step 406, at step 406 a calculation is made to determine the age of the vehicle in days based on information indicating the vehicle's age, for example the vehicle's registration date, purchase date, etc. The system then proceeds to step 407 where the Current Mileage is calculated based upon Equation 3:

Current Mileage=(age of the vehicle)×(avg. daily mileage)     Eqn. 3

After step 407, the system then proceeds to step 408 and returns the estimate of the Current Mileage. In the presently, preferred embodiment, returning the estimate of the current mileage would also include storing the estimate in the database.

Figure 5:
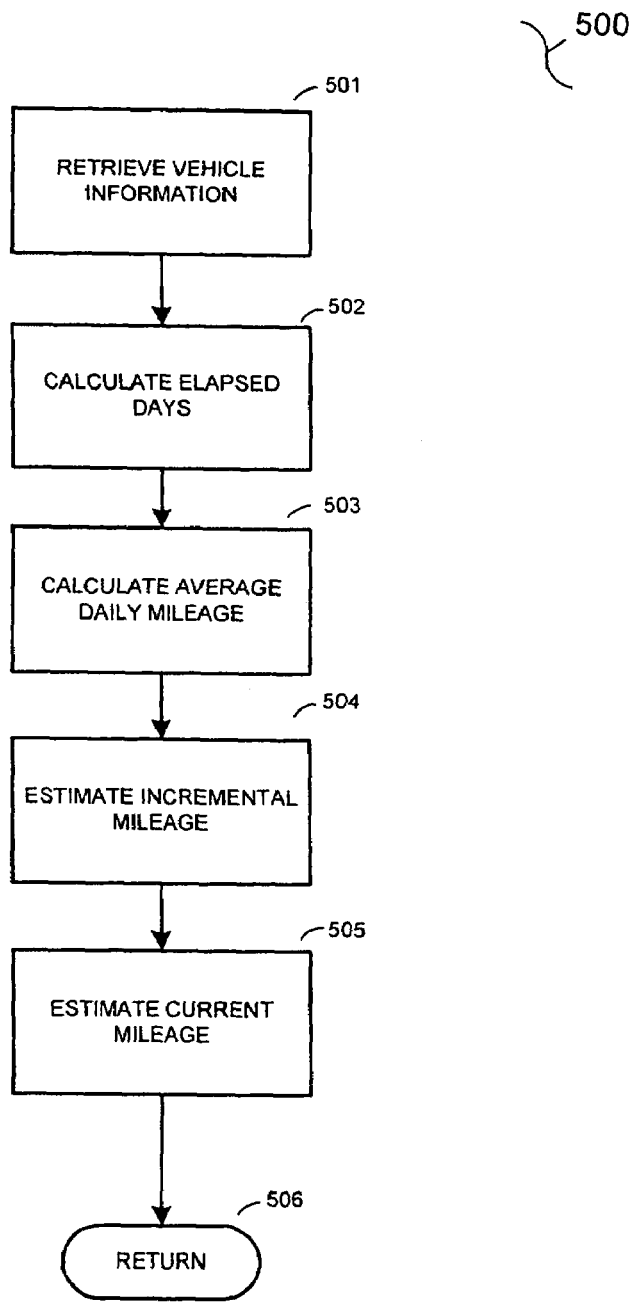
FIG. 5 is a flow diagram illustrating an alternative process of updating vehicle mileage, in accordance with the present invention.

An alternate embodiment of the present invention is shown in FIG. 5, where the process 500 is used to estimate the vehicle's mileage based on the known mileage history of the particular vehicle. At step 501 the vehicle's information is retrieved from the database, including the mileage of the vehicle, the date the vehicle's mileage was recorded, the age of the vehicle, and any other information used in the estimate. At step 502 the system calculates the number of days elapsed since the date the vehicle's mileage was recorded. At step 503 the average daily mileage of the vehicle is calculated, according to equation 4:

avg. daily mileage=Mileage/(days elapsed)     Eqn. 4

The mileage used in Equation 4 could be either to the total mileage of the vehicle, or it could be the incremental mileage between the last visit and a prior visit (or even between any two prior mileage readings). If the total mileage of the vehicle is used, the days elapsed used in Eqn. 4 will be the age of the vehicle in days. If the incremental mileage is used, then the days elapsed is the number of days between the to prior mileage readings, which in the presently preferred alternate embodiment is the two most recent prior service visits. As above, the mileage could be from an actual reading or another estimate. After calculating the average daily mileage for the particular vehicle at step 503, the system proceeds to step 504.

At step 504 an estimate of the incremental mileage is calculated with Equation 5:

Incremental Mileage=(days since last mileage recording)×(avg. daily mileage)     Eqn. 5

After estimating the Incremental Mileage at step 504, at step 505 an estimate for the current mileage is performed using Equation 6:

Current Mileage=Incremental Mileage+Last Mileage Recording     Eqn. 6

From step 505 process the system advances to step 506, where the estimate of the Current Mileage is returned.

Figure 6:
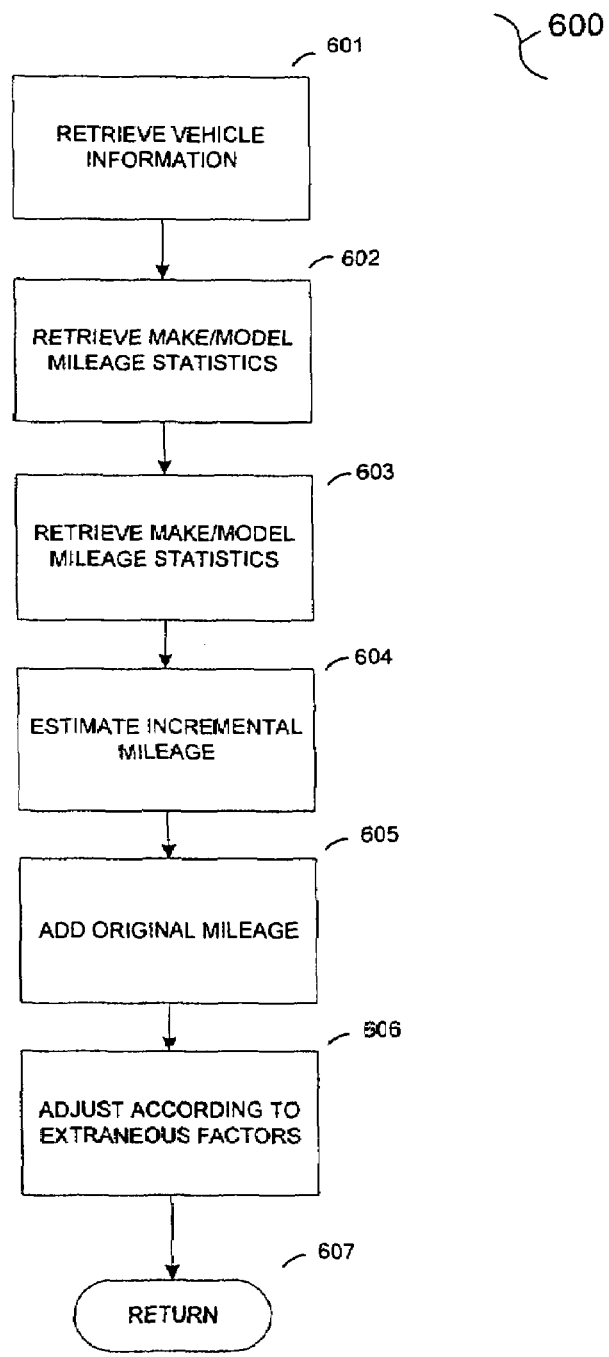
FIG. 6 is a flow diagram illustrating an alternative process of updating vehicle mileage, in accordance with the present invention.

Referring now to FIG. 6, an alternate embodiment of the present invention is shown utilizing make and model information to estimate the vehicle's mileage. The process 600 begins at step 601 with the retrieval of vehicle information from the database. In addition to mileage information, the system also retrieves other information on the vehicle, such as the vehicle's make, model, and model year. Additionally, the system could also retrieve information, such as options the vehicle has (automatic transmission, four wheel drive, option group, dealer installed optional equipment, aftermarket installed optional equipment, etc.), information relating to service history (such as a rebuilt motor, replaced transmission, number of time the muffler has been replaced), geographic information relating to where the vehicle is mainly driven or garaged, driver or owner information (such as age, sex, marital status, occupation, income, hobbies, dependents, whether the vehicle is owned by an individual or a business, etc.) or other such information on the vehicle.

The system then proceeds to step 602 where it retrieves from the database vehicle mileage statistics. Vehicle mileage statistics provide average daily mileage information based upon information retrieved at step 601. From step 602 the system proceeds to step 603 where the number of days elapsed since the date the vehicle's mileage was recorded is retrieved from the database. In the event there has been no entry into the database of a recording of the vehicle's mileage, or in the event the date of the vehicle's mileage is uncertain, then the system will proceed using zero mileage for the vehicle and calculate the age of the vehicle in days.

At step 604 an estimate of the incremental mileage is calculated with Equation 7:

Incremental Mileage=(days since last mileage recording)×$M^{vspec}_{avg}$     Eqn. 7 where $M^{vspec}_{avg}$ is the average daily mileage for a specific vehicle. $M^{vspec}_{avg}$ may also be dependent on the location of the vehicle, or any particular characteristics of the vehicle or the vehicle's owner/driver, as described above in the context of the information retrieved during steps 601 and 602.

After estimating the Incremental Mileage at step 604, at step 605 an estimate for the current mileage is performed using Equation 8:

Current Mileage=Incremental Mileage+Last Mileage Recording     Eqn. 8

From step 605 the system advances to step 606, where the estimate of the Current Mileage is adjusted for extraneous factors according to one of two possible equations. Equation 9 is used in step 606 when the mileage is expected to differ by a given percent from the Current Mileage estimated with Eqn. 8, as is typical of extraneous factors such as seasonal variation, as when people may drive additional miles during the summer, or when a vehicle is used in a certain way, for example when a pickup truck is used primarily to tow a boat and is a second vehicle of the owner. The Revised Current Mileage is given by:

Revised Current Mileage=Current Mileage×$\Delta^F$     Eqn. 9 where $\Delta^F$ is the extraneous factor multiplier. The extraneous factor multiplier $\Delta^F$ can be greater than, or less than, one to accommodate increases or decreases in expected mileage.

Alternatively, at step 606 the system could use equation 10 to estimate the Revised Current Mileage:

Revised Current Mileage=Current Mileage+$\Pi^F$     Eqn. 10 where $\Pi^F$ is the extraneous factor adder, and can be either positive or negative. One possible example of an extraneous factor adder is if a given winter had a particularly harsh storm, making driving difficult or impossible for several days. In such an instance a negative extraneous factor adder could be used to account for a modest deviation from typical average daily driving totals. While the presently preferred alternative embodiment utilizes an adjustment for extraneous factors, any of the embodiments in the present invention could use an extraneous factor adjustment to account for variations in driving habits among different vehicles and drivers.

From step 606 the system advances to step 607, where the estimate of the Current Mileage is returned.

Example Service Reminder

FIG. 7 illustrates an example service reminder message 700 generated by process 300 described in connection with FIG. 3. The reminder 700 is sent as an e-mail, and like a standard e-mail includes a greeting, or salutation, 701 and message body 702. The service reminder message body includes a mileage alert 703, a vehicle identifier 704, and at least one service reminder 705. In the example shown the mileage alert specifies the estimated current mileage of the vehicle (in this example 60,000 miles), or the mileage the vehicle is estimated to be approaching. As shown, the service reminder 705 is a mileage specific service reminder, identifying the belts and hoses as scheduled for inspection and replacement. The example service reminder message 700 also includes a service promotion 706, which is not mileage specific, e.g. a wash and wax service. Service reminders messages may include as many service reminders or service promotions as pertinent to the vehicle, and may include service reminders or service promotions to more than one vehicle if the recipient is responsible for the care and servicing of more than one vehicle. The message body 702 also includes scheduling instructions 707, which in the present example also includes a scheduling link 708 which is a hyperlink to a web site where the recipient can schedule service of the vehicle. In the presently preferred embodiment, the recipient of the service reminder message 700 (typically the owner of the vehicle, but possibly another person or specific address the message is sent to regarding care and maintenance of the vehicle) would click on the scheduling link, which would connect a browser on the recipients computer to the scheduling web site. Alternate embodiments of the present embodiment could have a phone number, IM address, or other identifying information as the scheduling link, providing the recipient with the ability to contact the service shop to schedule a service appointment. In addition to the greeting 701 and message body 702, the service reminder message 700 also includes a signature identifier 709, which may provide the recipient with a name and contact information for inquiries.

Promotions

As described above in connection with FIG. 7, the present invention provides for offering promotions in connection with mileage based service bulletins. As with the screening of service reminders in process 300 shown in FIG. 3, at step 303 the reminder server may also screen promotions to offer the recipient in the reminder generated at step 304. While promotions need not be mileage based, and can be general, as in the case of a car wash, they can be mileage specific in the case of an oil change or transmission flush. Additionally, promotions may also be screened for the characteristics of the vehicle (as with an offer for an automatic transmission service or an air conditioning service,) seasonal (as with air conditioning service or installation or snow tires) or specific to the habits or preferences of the driver (interior cleaning or other service). Promotions can be contingent on scheduling service for the subject of the service reminder 705, or may be independently redeemable. Additionally, promotions can be tied to specific service time slots, to maximize service visits during traditionally slow times.

Shop Management Integration Module

Many service shops, both independent shops and the service departments of automobile dealerships, have existing shop management systems. Service shops, typically, are small and do not have full time IT personnel. Installing, setting up and running a service reminder system is both costly and inconvenient. The present invention avoids many of these drawbacks in two ways. First, the service reminder system can be run on remote computers as a service, hosted and maintained by dedicated professionals. Additionally, the present invention provides for the ability to extract customer information from existing shop management systems and upload the customer information to the hosted service reminder system. This uploading process can be performed by non-technical staff at the service shop through the present inventions automated shop management integration module.

Figure 8:
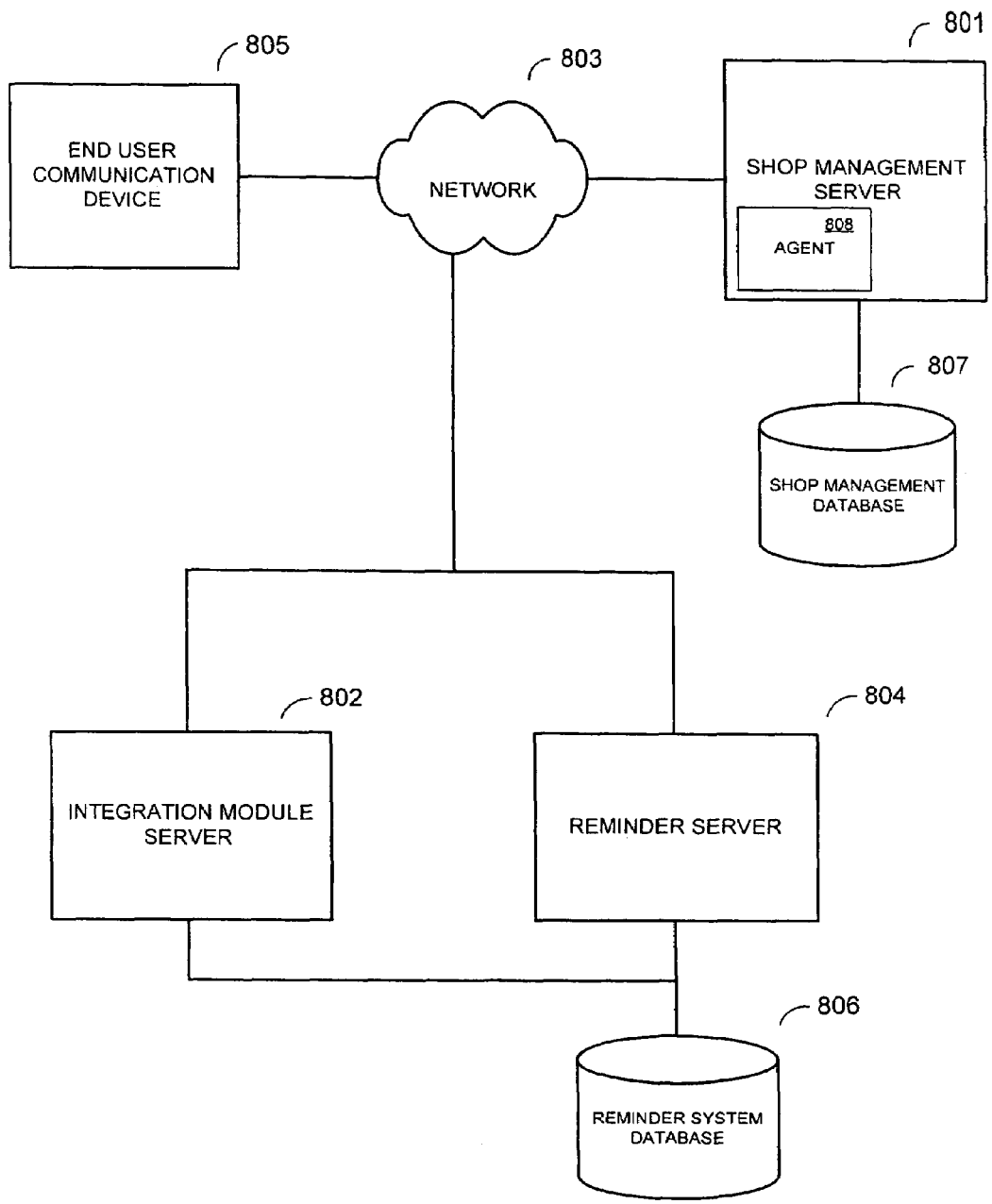
FIG. 8 is a generalized block diagram of a computer system that may be used to implement the shop management integration module of the present invention.

FIG. 8 illustrates the integration of the service reminder system described in FIGS. 1-7 with a shop management system server 801 and an integration module server 802. In the presently preferred embodiment the shop management system 801 connects to the integration module server 802 and a reminder server 804 through a communications network 803. The communications network also connects to an end user communications device 805. In addition to connecting to the communications network 803, the integration module server 802 connects to the reminder server 804 and the database server 806. As described above in connection to FIG. 1, the end-user communications device is a personal computer, connected to the internet, a mobile phone (including mobile phones with text messaging capabilities), standard telephone, or any other device capable of receiving text or voice messages. Customer and vehicle data for the shop is stored on a shop management database 807, which is connected to the shop management system server 801. Installed on the shop management server, or alternatively on the shop management database 807, is a gathering agent 808. The gathering agent's main function is to extract customer and vehicle information from the shop management database 807 and report it back to the service reminder system database 806.

While the presently preferred embodiment utilizes a separate server for the integration module server, alternate embodiments could have the integration module installed on the same server as reminder server 804 or the database server 806. Additionally, the information stored within the singe database of the presently preferred embodiment could be distributed among several databases in alternate embodiments.

The servers described in FIG. 8 are similar to the server described above in connection with FIG. 2.

Figure 9:
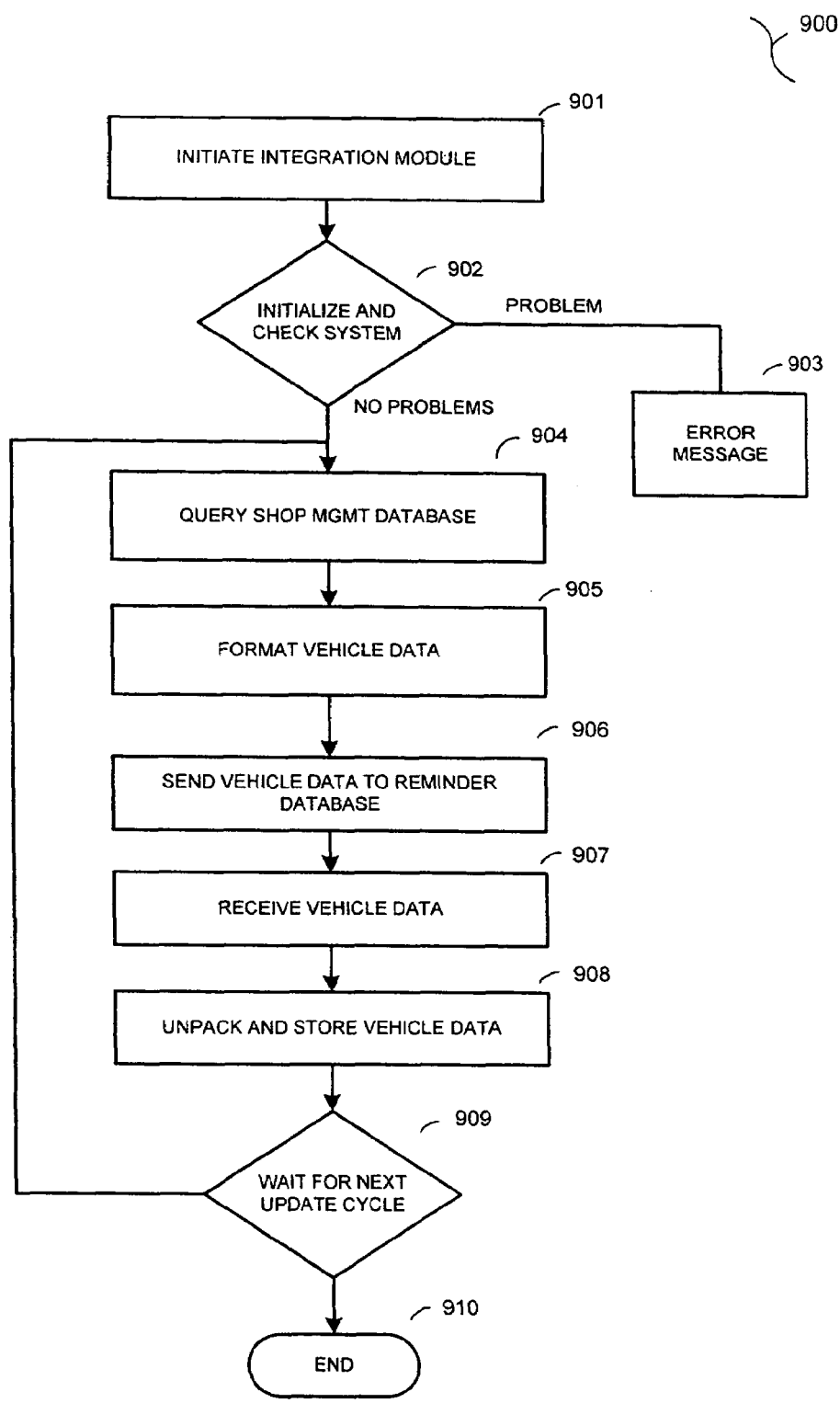
FIG. 9 is a general flow diagram of the process of downloading and updating customer and vehicle data from the shop management system, in accordance with the present invention.

FIG. 9 is a general flow diagram of the process 900 of downloading customer and vehicle data from the shop management system. The process 900 can be run either by an employee of the service shop, through a web based interface running connected to the communications network 803, or by an employee of the company running the reminder system as a service.

At step 901 the agent is initialized to extract data for the reminder system from the shop management database 807 and upload it to the service reminder system database 806. Initialization involves informing the agent of the location of the shop management database 807, the type of connection to the communication network 803, information about the shop management system, as well as preferences for uploading. Uploading preferences includes whether the uploading is manual of the upload is automatic, if automatic the time and frequency of the upload (for example at a specific time or during power up of the shop management system) as well as the type of information uploaded.

After step 901 the system proceeds to step 902 where the agent initializes itself and performs a test to verify that it can access the shop management database 807, the communication network 803, and service reminder system database 806. If at step 902 the test indicates the problem, then at step 903 an alert and error message is provided to the system operator installing and initializing the agent. If no problems are encountered then at step 904 the gathering agent 808 queries the shop management database 807 to retrieve customer and vehicle data. The customer and vehicle data includes the customer's name, contact information, vehicle's owned or cared for by the customer, the make, model, mileage, service history of each of the vehicles, as well as any other information used by the reminder system to estimate vehicle mileage, generate reminders, screen reminders, or offer promotions. In the presently preferred embodiment, the data retrieved by the gathering agent in step 904 is put into an XML file at step 905 and sent to the service reminder system database 806 using an HTTP post at step 906. Alternate embodiments could use FTP, or other systems or protocols to upload the data to the service reminder system database 806, and could format the data in other types of files or send the data in a non-file format. Due to the size of the customer and vehicle data XML file the agent creates several smaller files, which are uploaded one at a time to prevent problems with time-outs and lost connections. Alternative embodiments could upload the customer and vehicle data as a single file.

At step 907 the integration module server 802 of the service reminder system receives the customer and vehicle data XML file. At step 908 the integration module server 802 unpacks the customer and vehicle data XML file by parsing the XML file and then writes the data retrieved to the service reminder system database 806. After completing the unpacking and writing of the customer and vehicle data XML file at step 908 at step 909 the gathering agent waits for the next update. Typically, the update process will be specified as automatic, and on a regular interval, preferably nightly, will resume the process of updating the service reminder system database 806 by returning to step 904 to retrieve customer and vehicle data and continue the process through to return to step 909 to wait for the next update cycle. In the preferred embodiment of the present invention, the updating at step 904 would only update new information added since the last uploading of customer and vehicle data to the service reminder system database 806. If at step 909 the system is set to manual update, the gathering agent can either wait at step 909 for a manual indication to initiate an update of customer and vehicle data, or it may proceed to step 910 to end process 900.

Scheduling Service Appointments

Figure 10:
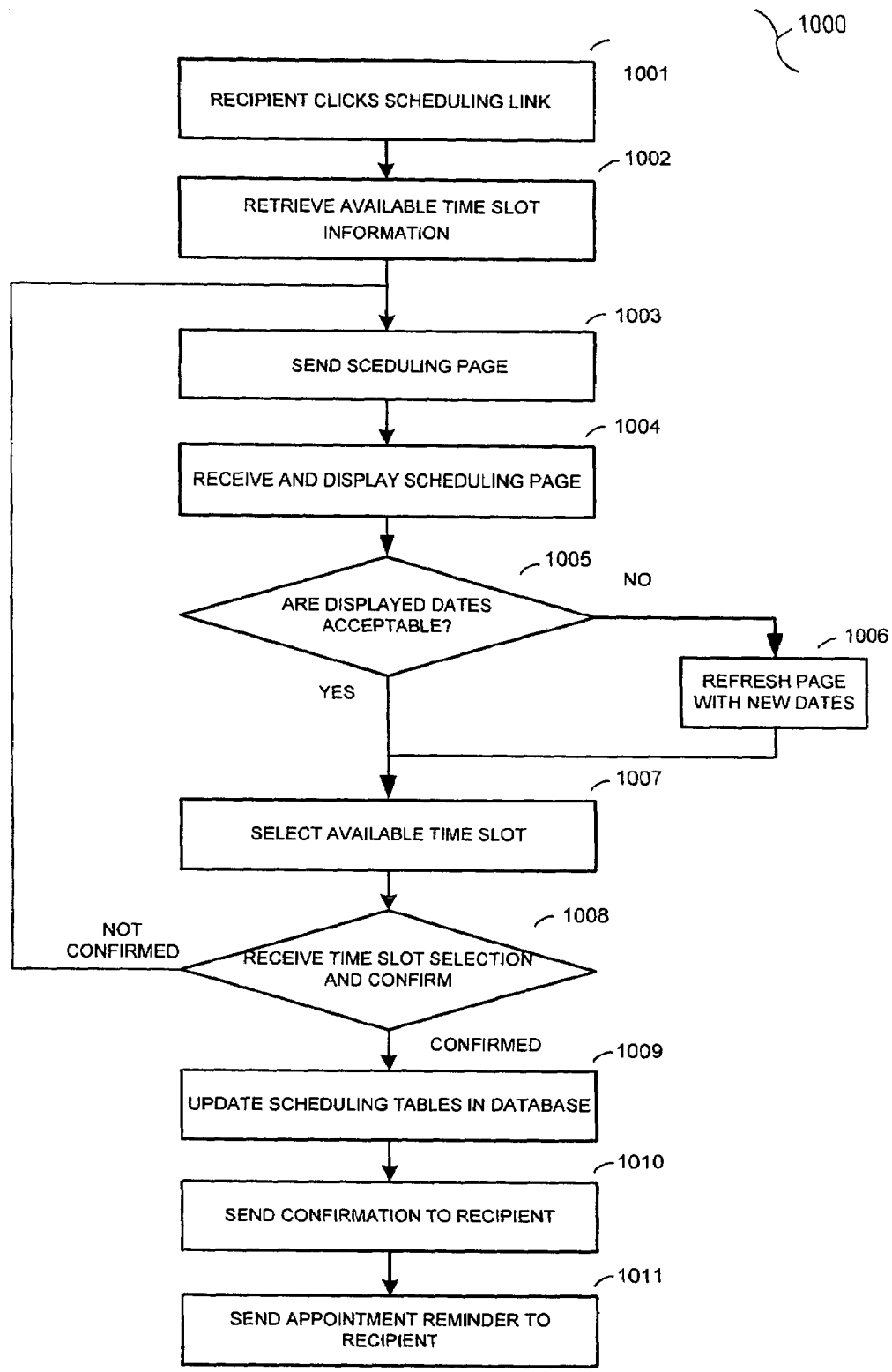
FIG. 10 is a flow diagram illustrating the process of scheduling service appointments, in accordance with the present invention.

As described above in connection with serve reminder's in FIGS. 3 and 7, the present invention allows the recipient of the service reminder to schedule a service appointment by clicking on the scheduling link 708 included in the service reminder. FIG. 10 illustrates the process 1000 of scheduling service appointments.

At step 1001 the recipient clicks the scheduling link 708 contained within the service reminder 700 received as an e-mail message. In response to clicking the scheduling link the recipient's computer 104 opens a browser and sends an HTTP get request to the reminder server 101, sending the URL of the scheduling link 708 in the HTTP get request. At step 1002 the reminder server retrieves information concerning the time slots that are available, taking into account the restrictions the shop may have in scheduling certain types of service in parallel service bays, or at particular hours, etc. At step 1003 the reminder server responds and sends a web page for the recipient's browser to display a scheduling page shown in FIG. 11. The page sent by the reminder server is displayed in the recipient's browser at step 1004. Based on the URL sent at step 1001, which was initially included in the service reminder 700, the page returned at step 1003 includes the specific information about the recipient, the vehicle or vehicles that were the subject of the service reminder(s) 705 in the service reminder 700, the shop that sent the service reminder (and in the case of a chain of shops, the particular branch shop either frequented by the recipient or closest to the recipient), as well as particulars of the shop. Particulars of the shop include the shop's hours, available service slots, available services (restricted to exclude services that are not available for that make, model or other attribute of the vehicle), and the location and direction information for the shop. The service or services identified in service reminder 705 are already entered at 1003 as selected services in the scheduling page.

The recipient may select from available time slots the day and time the recipient would like to bring the vehicle in for service from the web page show below in FIG. 11. If the page returned does not have a time slot the recipient finds acceptable the recipient can ask to see available time slots for a different day (or week, or month) at step 1005, and the reminder server will refresh the page with available time slots in the date rage indicated by the recipient at step 1006. At step 1007 the recipient selects an available time slot to schedule and appointment and schedules the appointment. Additionally, at step 1008 the service reminder server determines whether the service slot is available. In this manner the next customer/recipient to schedule a time slot for a service appoint will not receive as available time slots already filled by prior customer/recipients. In the presently preferred embodiment, the reminder server may schedule up to four customers for service at a particular time slot. Alternate embodiments could have more or fewer automatic approvals for scheduling service appointments. If there are more service appointments requested for a give service slot the system can request manual approval of a shop employee. If the service slot is no longer available, or is not approved, then the system returns to step 1003 to offer the recipient alternative time slots. After a time slot is approved at step 1008, the reminder server receives the recipients selected time slot and enters the information in the database at step 1009. After step 1009, the reminder server sends a confirmation to the recipient at 1010. The confirmation can be in any form specified (e-mail, postal mail, voice mail, etc.). Optionally, the reminder server can send an appointment reminder at step 1011, at a preset time prior to the scheduled appointment.

Figure 11:
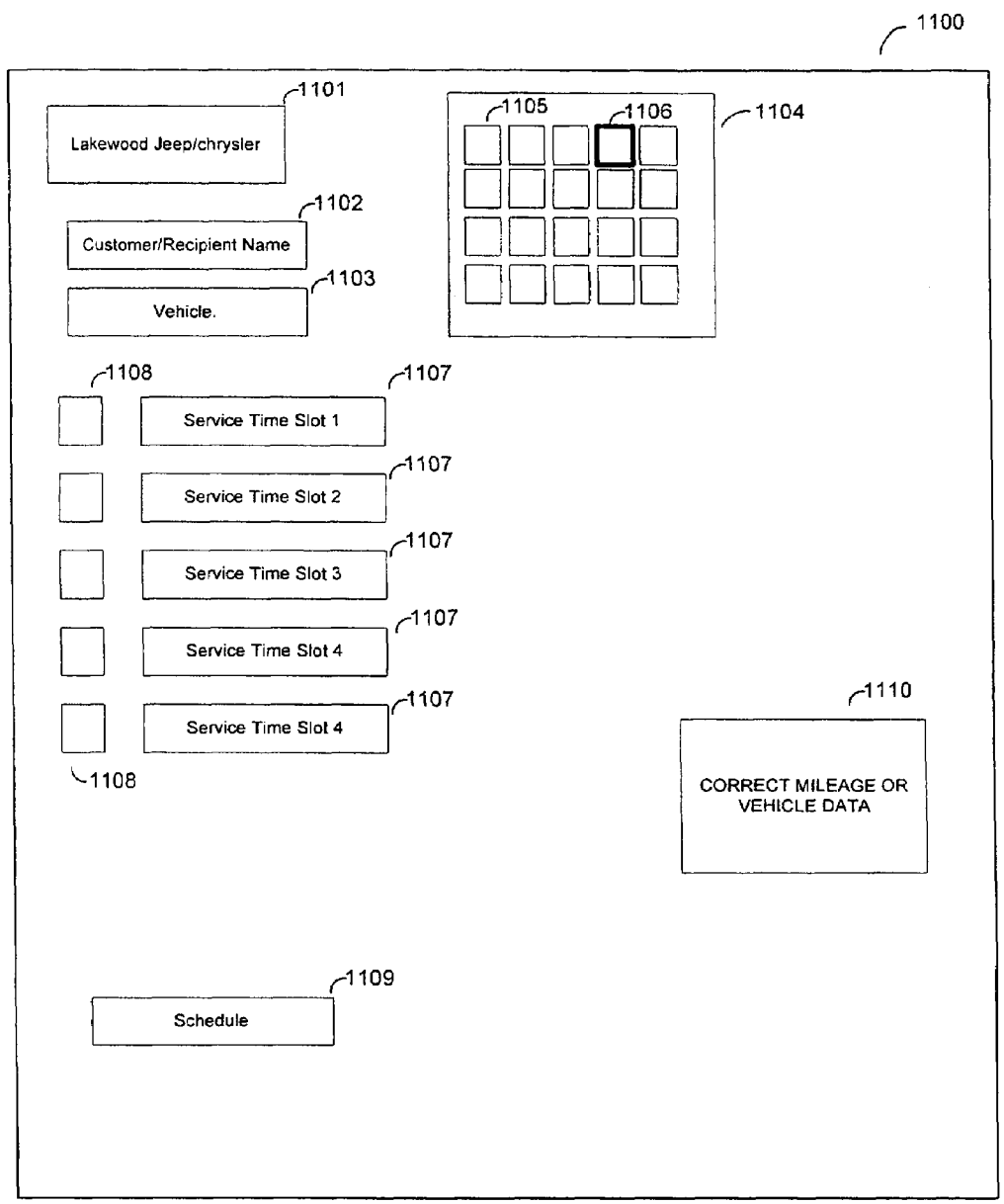
FIG. 11 illustrates and example service appointment scheduling page, in accordance with the present invention.

FIG. 11 illustrates an example service appointment scheduling page 1100 sent by process 1000 described above. Service appointment scheduling page 1100 includes a shop identifier 1101, a recipient (or customer/owner) identifier 1102, and a vehicle identifier 1103. The scheduling information includes the calendar identifier 1104, day identifiers 1105, the day selector 1106, the time slot identifiers 1107 and the time-slot check boxes 1108. In the presently preferred embodiment the recipient scheduling an appointment is given a calendar identifier 1104 that displays in calendar format all the days that are available to schedule appointments using the day identifiers 1105. Days that are not available are not displayed, or the day identifier 1105 is shown in a de-emphasized manner to indicate that these days are not available. Days could become unavailable due to the shop being closed on that day, or because all of the available service slots have been filled. The day selected by the recipient is indicated by the day selector 1106. The time slot identifiers 1107 indicate the available time slots for scheduling service on the date indicated by the day selector 1106. Time slots that are either filled or otherwise unavailable are either not displayed on the scheduling page 1100 or are shown de-emphasized to indicate their unavailability. Corresponding to the time slot identifiers is are time-slot check boxes 1108. The recipient may select from among the available time slots by checking the time-slot check boxes 1108 corresponding to the desired time slot. After selecting an available time slot the recipient may schedule the appointment by clicking on the schedule button 1109, which returns the page with the selected time slot to the reminder server. At any time the recipient may click on a mileage and data update/correct button 1110. Clicking the mileage and data update/correct button 1110 allows the user the update their current mileage (thereby entering a new last known mileage), change preferences or information about their current vehicles, add or delete vehicles, update or change vehicle contact/recipient/driver information, or any other information stored to generate and manage service reminders.

Alternate embodiments of the present invention could use a drop down menu or select-from list for recipients to select the desired time slot from the available time slots.

Alternate embodiments of the present invention could display the day identifier without the calendar identifier, allowing the recipient to scroll through available days, or select alternate dates from a list.

Customer Satisfaction Surveys

The present invention also provides the service shop a convenient way of conducting surveys and increasing business by offering related promotions. The reminder server 101 of FIG. 1 may send an e-mail survey with a link to a URL which, when clicked, produces a customer survey which, as with the scheduling page 1100 of FIG. 11 and the process 1000 of generating a scheduling page based on the URL of FIG. 10, is specific to the recipient, the time and date of the scheduled service, and the type of service and promotions offered and used by the recipient. Additionally, the present invention provides for the ability, as with the correct mileage/data button 1110 for FIG. 11, for the recipient to update or correct data relating to current mileage (thereby entering a new last known mileage), change preferences or information about their current vehicles, add or delete vehicles, update or change vehicle contact/recipient/driver information, or any other information stored to generate and manage service reminders.

Service Bulletin Updates

Figure 12:
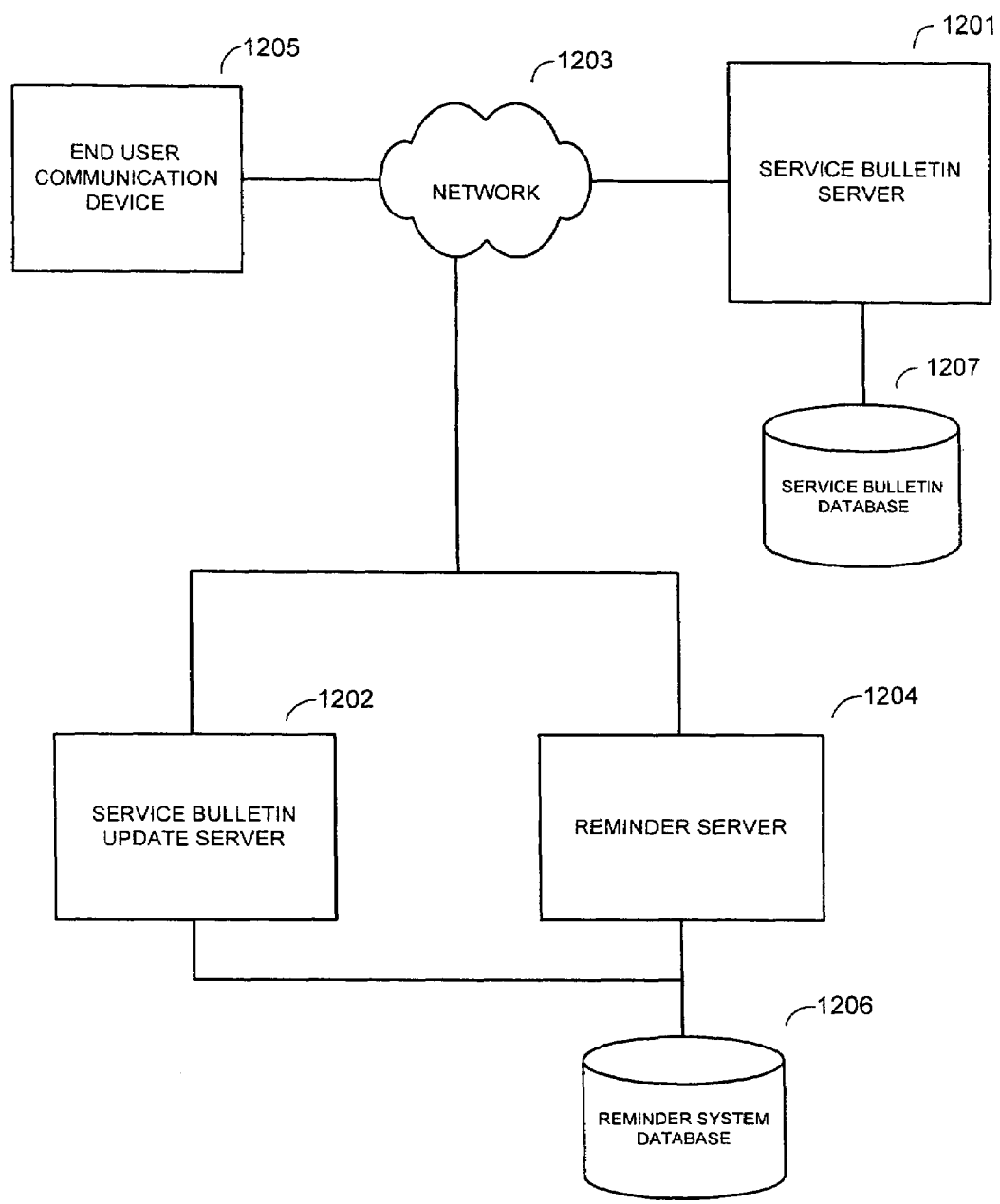
FIG. 12 is a generalized block diagram of a computer system that may be used to implement the service bulletin module of the present invention.

FIG. 12 illustrates the integration of the service reminder system described in FIGS. 1-7 with a service bulletin server 1201 and a service bulletin update server 1202. Service bulletins, especially government mandated recalls and service bulletins, are made available to the public through on-line systems. The present invention provides for the automated updating and service reminder generation based on such bulletins. In the presently preferred embodiment the service bulletin server 1201 connects to the service bulletin update server 1202 and a reminder server 1204 through a communications network 1203. The communications network also connects to an end user communications device 1205. In addition to connecting to the communications network 1203, the service bulletin update server 1202 connects to the reminder server 1204 and the database server 1206. As described above in connection to FIG. 1, the end-user communications device is a personal computer, connected to the internet, a mobile phone (including mobile phones with text messaging capabilities), standard telephone, or any other device capable of receiving text or voice messages. Service bulletins are stored in the service bulletin database 1207, which is connected to the service bulletin server 1201.

While the presently preferred embodiment utilizes a separate server for the service bulletin upgrade server, alternate embodiments could have the service bulletin upgrade module installed on the same server as reminder server 1204 or the database server 1206. Additionally, the information stored within the singe database of the presently preferred embodiment could be distributed among several databases in alternate embodiments.

The servers described in FIG. 12 are similar to the server described above in connection with FIG. 2.

Figure 13:
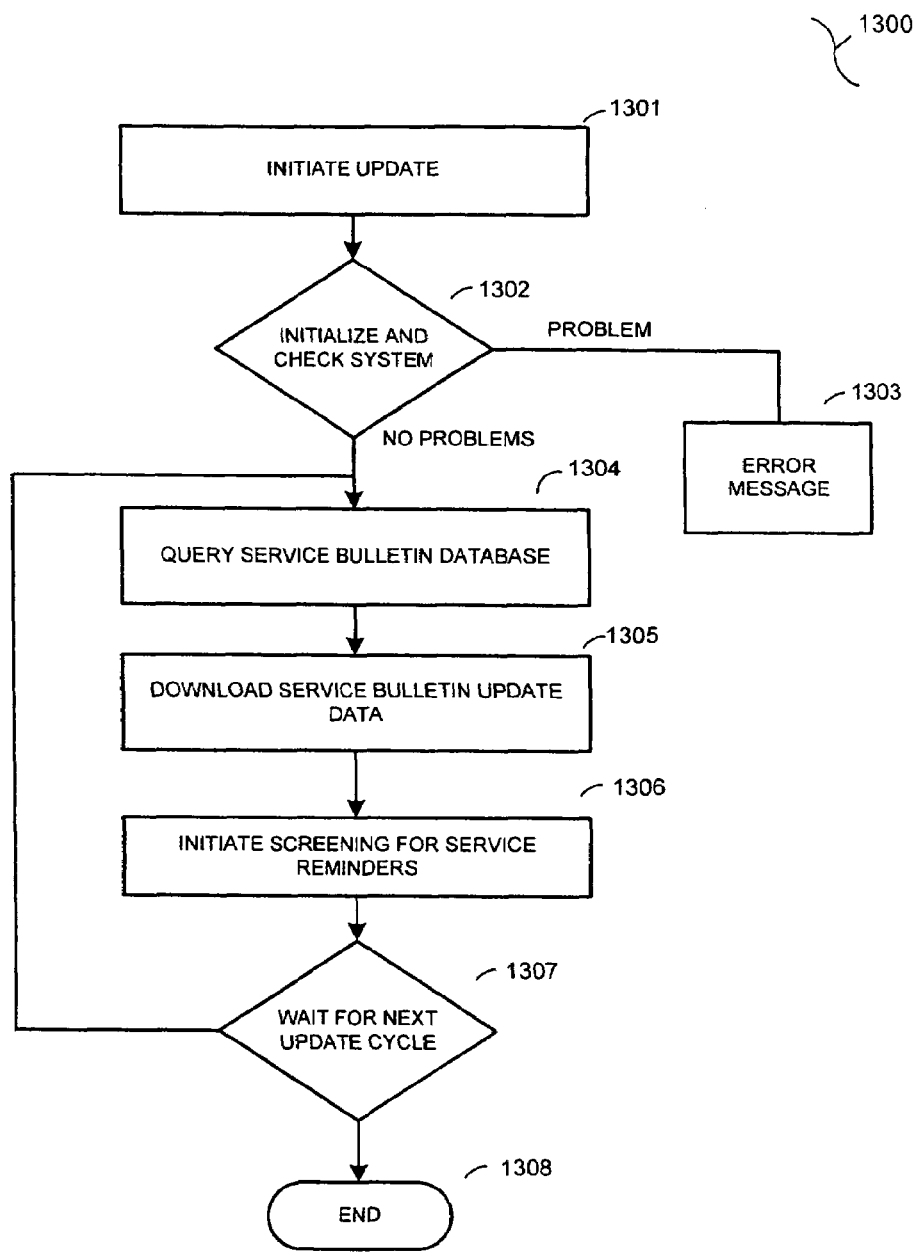
FIG. 13 is a general flow diagram of the process of downloading and updating service bulletins, in accordance with the present invention.

FIG. 13 is a general flow diagram of the process 1300 of downloading service bulletin data from the shop management system. The process 1300 can be run either by an employee of the service shop, through a web based interface running connected to the communications network 1203, or by an employee of the company running the reminder system as a service. Alternatively, the updating process 1300 can be automated and scheduled to check for updates periodically, or in response to an indication from the service bulletin server 1201 that updates are available.

At step 1301 the update process is initialized to extract data for the reminder system from the service bulletin database 1207 and upload it to the service reminder system database 1206. Initialization involves informing the service bulletin update server 1202 of the location of the service bulletin server 1201 and the service bulletin database 1207, the type of connection to the communication network 1203, information about the service bulletin system, as well as preferences for uploading. Uploading preferences includes whether the uploading is manual of the upload is automatic, if automatic the time and frequency of the upload (for example at a specific time or during power up of the shop management system) as well as the type of information uploaded.

After step 1301 the system proceeds to step 1302 where the service bulletin update server 1202 initializes itself and performs a test to verify that it can access service bulletin server 1201, the service bulletin database 1207, the communication network 1203, and service reminder system database 1206. If at step 1302 the test indicates the problem, then at step 1303 an alert and error message is provided to the system operator installing and initializing the service bulletin update server 1202. If no problems are encountered then at step 1304 the service bulletin update server 1202 queries the service bulletin database 1207 to retrieve updated bulletins. At step 1305 the service bulletin update server 1202 downloads the bulletin updates At step 1306 the service bulletin update server 1202 initiates a screening for serve reminders as described in FIG. 3. At step 1307 the service bulletin update server 1202 waits for the next update cycle, which may be manual or automated as described above. If at step 1307 the service bulletin update server 1202 receives an indication to update service bulletins, the it proceeds to step 1304 to begin to query the service bulletin database. If the update process is manual, or otherwise times out, the service bulletin update server 1202 ends process 1300 at step 1308.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

We claim:

1. A computer-implemented method of scheduling a service appointment based on a service reminder for a vehicle, comprising:
    a computer system for generating mileage based service reminders retrieving information on the vehicle, the information comprising a vehicle characteristic and a vehicle driver demographic;
    the computer system retrieving vehicle mileage statistics, including average daily mileage information, based upon the vehicle characteristic and the vehicle driver demographic included in the retrieved information;
    the computer system calculating a current mileage estimate of the vehicle using the vehicle mileage statistics and the vehicle characteristic and vehicle driver demographic included in the retrieved information;
    the computer system comparing the current mileage estimate to one or more service reminders; and
    the computer system generating a vehicle service reminder for the vehicle if the current mileage estimate of the vehicle is within a mileage window of one or more of the service reminders,
    wherein the vehicle service reminder comprises scheduling information to allow a recipient of the service reminder to schedule a service appointment.

2. A computer-implemented method of scheduling a service appointment based on a service reminder for a vehicle, comprising:
    a computer system for generating mileage based service reminders retrieving information on the vehicle, the information comprising a vehicle characteristic and a vehicle driver demographic;
    the computer system retrieving vehicle mileage statistics based upon the vehicle characteristic and vehicle driver demographic included in the retrieved information;
    the computer system calculating an average mileage per time factor for the vehicle based on the vehicle mileage statistics and the retrieved information;
    the computer system calculating a current mileage estimate of the vehicle using the calculated average mileage per time factor and the retrieved information;
    the computer system comparing the current mileage estimate to one or more service reminders; and
    the computer system generating a vehicle service reminder for the vehicle if the current mileage estimate of the vehicle is within a mileage window of one or more of the service reminders,
    wherein the vehicle service reminder comprises a scheduling link to a scheduling page.

3. The computer-implemented method of claim 2, further comprising sending the vehicle service reminder as an e-mail message to a recipient responsible for the care of the vehicle.

4. The computer-implemented method of claim 2, further comprising sending a scheduling page in response to a recipient of the vehicle service reminder clicking on the scheduling link.

5. The computer-implemented method of claim 4, wherein the scheduling page includes:
    at least one service time slot, and
    a selection indicator allowing the recipient to indicate a selection of a particular service time slot.

6. The computer-implemented method of claim 1, wherein the vehicle information comprises a vehicle service history, the method further comprising the step of calculating a current mileage estimate of a vehicle component using the current mileage estimate of the vehicle and the vehicle service history.

7. The computer-implemented method of claim 6, further comprising:
    comparing the current mileage estimate of the vehicle component to the one or more service reminders; and
    generating a vehicle service reminder for the vehicle if the current mileage estimate of the vehicle component is within a mileage window of one or more of the service reminders.

* * * * *

UNITED STATES PATENT AND TRADEMARK OFFICE
CERTIFICATE OF CORRECTION

PATENT NO. : 7,542,833 B2
APPLICATION NO. : 10/859400
DATED : June 2, 2009
INVENTOR(S) : John Kelly, John Supra and Michael Rush It is certified that error appears in the above-identified patent and that said Letters Patent is hereby corrected as shown below:

Title page, item [56], References Cited, Other Publications reads, "Office Action for U.S. Appl. No. 10/453,094..." which should read, "Office Action for U.S. Appl. No. 10/453,904..."

Title page, item [56], References Cited, Other Publications reads, "Office Action for U.S. Appl. No. 10/860,530..." which should read, "Office Action for U.S. Appl. No. 10/860,539..."

Title page, item [56], References Cited, Other Publications: Wang reads, "...Computer and Information Sciences..." which should read, "...Computer and Information Science..."

Title page, item [57], Abstract, Line 3 reads, "...based on the estimated mileage the vehicle." which should read, "...based on the estimated mileage of the vehicle."

Column 1, Line 31 reads, "...around 30,000 mile on the odometer." which should read, "...around 30,000 miles on the odometer."

Column 2, Line 4 reads, "FIG. 11 illustrates and example..." which should read, "FIG. 11 illustrates an example..."

Column 2, Lines 19 and 23 read, "...vehicles mileage..." which should read, "...vehicle's mileage..."

Column 2, Line 24 reads, "...the last know mileage..." which should read, "...the last known mileage..."

Column 3, Line 48 reads, "...and EPROM..." which should read, "...an EPROM..."

Column 4, Line 36 reads, "...after noticing the break wear..." which should read, "...after noticing the brake wear..."

Signed and Sealed this
Fourth Day of September, 2012

David J. Kappos
*Director of the United States Patent and Trademark Office*

CERTIFICATE OF CORRECTION (continued)
U.S. Pat. No. 7,542,833 B2

Column 4, Line 43 reads, "...may be set for a 50,000 miles service..." which should read, "...may be set for a 50,000 mile service..."

Column 5, Line 16 reads, "...the vehicles current mileage..." which should read, "...the vehicle's current mileage..."

Column 5, Line 50 reads, "...sent at a time must appropriate..." which should read, "...sent at a time most appropriate..."

Column 6, Line 29 reads, "...estimating the vehicles mileage." which should read, "...estimating the vehicle's mileage."

Column 6, Line 33 reads, "...see if there the information retrieved..." which should read, "...see if the information retrieved..."

Column 6, Line 49 reads, "...last known Mileage would be..." which should read, "...last known mileage would be..."

Column 7, Line 12 reads, "In the presently, preferred..." which should read, "In the presently proffered..."

Column 7, Line 35 reads, "...between the to prior..." which should read, "...between the two prior..."

Column 9, Line 17 reads, "Service reminders messages..." which should read, "Service reminder messages..."

Column 9, Line 31 reads, "...on the recipients computer..." which should read, "...on the recipient's computer..."

Column 9, Line 45 reads, "...the screening os..." which should read, "...the screening of..."

Column 9, Line 54 reads, "...air conditioning service,)..." which should read, "...air conditioning service),..."

Column 10, Line 12 reads, "...the present inventions automated shop..." which should read, "...the present invention's automated shop..."

Column 10, Line 40 reads, "...within the singe database..." which should read, "...within the single database..."

Column 10, Line 60 reads, "Uploading preferences includes whether..." which should read, "Uploading preferences include whether..."

CERTIFICATE OF CORRECTION (continued)
U.S. Pat. No. 7,542,833 B2

Column 11, Line 8 reads, "...vehicle's owned or cared for..." which should read, "...vehicles owned or cared for..."

Column 11, Line 49 reads, "...in connection with serve reminder's..." which should read, "...in connection with serve reminders..."

Column 12, Line 19 reads, "...from the web page show below in FIG.11." which should read, "...from the web page shown below in FIG. 11."

Column 12, Line 26 reads, "...schedule and appointment..." which should read, "...schedule an appointment..."

Column 12, Line 30 reads, "...a service appoint..." which should read, "...a service appointment..."

Column 12, Line 36 reads, "...requested for a give service..." which should read, "...requested for a given service..."

Column 12, Line 41 reads, "...receives the recipients selected time slots..." which should read, "...receives the recipient's selected time slots..."

Column 12, Line 43 reads, "...sends a confirmation to the recipient at 1010." which should read, "...sends a confirmation to the recipient at step 1010."

Column 13, Line 4 reads, "...is are time-slot check boxes..." which should read, "...are time-slot check boxes..."

Column 13, Line 13 reads, "...the update their current mileage..." which should read, "...to update their current mileage..."

Column 14, Line 10 reads, "...within the singe database..." which should read, "...within the single database..."

Column 14, Line 33 reads, "Uploading preferences includes whether..." which should read, "Uploading preferences include whether..."

Column 14, Line 34 reads, "...uploading is manual of the upload is automatic..." which should read, "...uploading is manual or the upload is automatic..."

Column 14, Line 50 reads, "...downloads the bulletin updates..." which should read, "...downloads the bulletin updates."

Column 14, Line 58 reads, "...the it proceeds to step 1304..." which should read, "...then it proceeds to step 1304..."